United States Patent
Janisch

(10) Patent No.: US 12,176,832 B2
(45) Date of Patent: Dec. 24, 2024

(54) POSITION SENSOR SYSTEM AND METHOD FOR DETECTING AN ERROR OF A POSITION SENSOR SYSTEM

(71) Applicant: Renesas Electronics America Inc., Milpitas, CA (US)

(72) Inventor: Josef Janisch, Ilz (AT)

(73) Assignee: Renesas Electronics America Inc., Milpitas, CA (US)

(*) Notice: Subject to any disclaimer, the term of this patent is extended or adjusted under 35 U.S.C. 154(b) by 172 days.

(21) Appl. No.: 18/155,288

(22) Filed: Jan. 17, 2023

(65) Prior Publication Data

US 2023/0231502 A1 Jul. 20, 2023

(30) Foreign Application Priority Data

Jan. 19, 2022 (EP) ..................................... 22152163

(51) Int. Cl.
*H03M 1/12* (2006.01)
*H02P 21/18* (2016.01)
*H02P 29/024* (2016.01)

(52) U.S. Cl.
CPC ............ *H02P 21/18* (2016.02); *H02P 29/024* (2013.01); *H02P 2203/03* (2013.01)

(58) Field of Classification Search
CPC .... H02P 21/18; H02P 29/024; H02P 2203/03; H02P 23/14
See application file for complete search history.

(56) References Cited

U.S. PATENT DOCUMENTS

| 4,853,604 | A | 8/1989 | McMullin et al. |
| 5,429,093 | A | 7/1995 | Fukui et al. |
| 5,574,535 | A | 11/1996 | Ogasawara |
| 9,952,065 | B2 | 4/2018 | Leoncavallo et al. |
| 2007/0043528 | A1* | 2/2007 | Bae .......................... G01P 3/488 702/142 |
| 2007/0115769 | A1 | 5/2007 | Kawase |
| 2019/0325328 | A1 | 10/2019 | Katz et al. |
| 2021/0003424 | A1 | 1/2021 | Bang |

FOREIGN PATENT DOCUMENTS

| EP | 3640602 A1 | 4/2020 |
| EP | 3699554 A1 | 8/2020 |

OTHER PUBLICATIONS

Extended European Search Report dated Jul. 1, 2022 issued in EP 22152163.6.

* cited by examiner

*Primary Examiner* — Muhammad S Islam
(74) *Attorney, Agent, or Firm* — SCULLY, SCOTT, MURPHY & PRESSER, P.C.

(57) ABSTRACT

A method and position sensor system for detecting an error of a position sensor system are provided. The method and position sensor system implementing the steps of: determining the period length of three previous signal periods of the position signal, comparing the period lengths of the three previous signal periods of the position signal to detect a constant velocity position signal, a constant accelerating or decelerating position signal or position signal with a constant jerk, predicting the period length of the next signal period of the position signal, transferring the predicted period length of the next signal period to a predicted position signal for the next signal period, and comparing the predicted position signal with the actual position signal to detect errors in the position signal of the next signal period.

15 Claims, 12 Drawing Sheets

POSITION SENSOR SYSTEM AND METHOD FOR DETECTING AN ERROR OF A POSITION SENSOR SYSTEM

CROSS-REFERENCE TO RELATED APPLICATION

The subject application claims priority under 35 U.S.C. § 119 to European Patent Application No. 22152163.6, filed on Jan. 19, 2022. The entire disclose of European Patent Application No. 22152163.6 is incorporated by this reference.

BACKGROUND

The invention relates to a method for detecting an error of a position sensor system providing a periodic position signal. The invention further relates to a position sensor system providing a periodic position sensor along a movement path implementing the method according to the invention.

Many applications need position feedback of a target like a rotating member, for example in motor control systems. In most cases, an additional position sensor is mounted at one end of a rotating shaft of the motor to generate the required position information. From the prior art, magnetic position sensors, optical position sensors and inductive position sensors are known. Since current carrying parts like motor cables or battery cables, a rotating motor package, the stator of the motor or additional equipment like a motor brake may cause magnetic fields, the use of inductive position sensors is preferred to provide robustness against such magnetic fields.

There are disclosed techniques listed below.
[Patent Document 1] U.S. Pat. No. 4,853,604
[Patent Document 2] EP Patent Specification No. 3,699,554
[Patent Document 3] EP Patent Specification No. 3,640,602
[Patent Document 4] U.S. Pat. No. 9,952,065

Inductive position sensors implement a magnet-free technology, utilizing the physical principles of eddy currents or inductive coupling to detect the position of a target that is moving above a set of coils, consisting for example of one transmitter coil and two receiver coils, particularly a sine receiver coil and a cosine receiver coil. Such an inductive sensor system is for example disclosed in Patent Document 1.

In a practical implementation of the three coils, one transmitter coil and two receiver coils, are typically provided as copper traces on a printed circuit board (PCB). They are arranged such that the transmitter coil induces a secondary voltage in the two receiver coils, which depends on the position of the conductive, e.g. metallic, target above the receiver coils. Therefore, the inductive sensor comprises or is connected to an oscillator that generates a radio-frequency signal, which is applied to the transmitter coil to create a static high frequency magnetic field. This static high frequency magnetic field is picked up by the receiver coils, particularly the sine receiver coil and the cosine receiver coil. Depending on the position of the conductive target above the coils, the secondary voltage picked up by the receiver coils is changing in amplitude, allowing the determination of the target's position by analysing this effect. For example, the target's position is calculated by the arctangent of the sine signal divided by the cosine signal. The calculation is performed by a processing unit, which is connected to the position sensor or integral part of the position sensor.

In order to process the sine signal and the cosine signal, a complex circuit containing a demodulator, a gain stage, offset and gain mismatch compensation, an analog-to-digital converter and a digital signal processing unit providing some form of arctangent calculation is necessary.

Particularly, rotational position sensors provide a periodic position signal, wherein one period of the position signal corresponds to one full turn of a rotating member. However, also other position sensors like linear position sensors or arc motion position sensors can provide periodic position signals.

In safety critical systems, a position sensor system must generate a warning flag when the accuracy of that system exceeds a certain safety level. The method detecting the error of the position sensor system shall be provided either by the position sensor system directly or by means of an external safety mechanism. A practical example for this requirement is a position sensor system, which creates a warning or alarm signal when it deviates from the actual position by more than ±6 degrees.

In order to determine the error of the position sensor system with high accuracy, a high precision reference encoder is needed. Such reference encoder is relatively large and expensive in relation to the actual position sensor system. Therefore, this approach is only economically usable in a laboratory evaluation environment. Naturally, these reference encoders cannot be integrated in a Sensor Integrated Circuit (IC). Therefore, other methods must be utilized for determining the indicated error of the position sensor system.

Patent Document 2 discloses a position sensor system, particularly for detecting rotary movement, comprising a position sensor with a first sensor output and a second sensor output, a first signal processing unit for processing the signal of the first sensor output or the second sensor output, a second signal processing unit for processing the signal of the second sensor output or the first sensor output, a first system output providing the output of the first signal processing unit or of the second signal processing unit, and a second system output providing the output of the second signal processing unit or of the first signal processing unit. The position sensor system further comprises a swapping unit for swapping the first signal processing unit from the first sensor output and the first system output to the second sensor output and the second system output and for simultaneously swapping the second signal processing unit from the second sensor output and the second system output to the first sensor output and the first system output and vice versa. The position sensor system can detect errors by comparing each output signal in the swapped and un-swapped condition.

Patent Document 3 discloses a method of correcting errors in a rotational position sensor having a sine signal and a cosine signal. The method includes compiling data from the sine signal and the cosine signal over a period of rotation; determining offset correction parameters from the data; correcting the data with the offset correction parameters; determining amplitude difference parameters from the data; correcting the data with the amplitude difference parameters; determining phase difference parameters from the data; correcting the data with the phase difference parameters; and using the offset correction parameters, the amplitude difference parameters, and the phase difference parameters to correct the sine signal and the cosine signal. The method bases on the fact that there is a correlation between magnitude ripple and error of the position sensor, provided that the error originates in an offset on the sine signal and/or the cosine signal, a mismatch of amplitudes of sine and cosine signals or a phase error between sine and cosine signals. In case of combinations of offset on the sine signal and/or the cosine signal as well as mismatch of the sine signal and the cosine signal amplitudes, the error can no longer be precisely determined. Depending on the mix of offset and amplitude mismatch, the deviation between calculated error and actual error can be up to ~±16.5%.

The Giant Magneto Resistive (GMR) angle sensor Infineon's TLE5012B comprises an optional prediction feature, which serves to reduce the speed dependent angle error in applications where the rotation speed does not change abruptly. Prediction uses the difference between current and last two angle values to approximate the angle value which will be present after the delay time. The output value is calculated by adding this difference to the measured value. The disadvantage of this method is that it only compensates for propagation delay errors caused by constant speed. It is less precise during constant or changing acceleration. In addition, as it uses consecutive measurement samples as a basis for calculating the propagation delay, any error in the samples will also lead to errors in the calculated propagation delay and consequently, inaccuracy of the calculated propagation delay error.

Patent Document 4 discloses a position sensor device to determine a position of a moving device, comprising a detection unit to detect a signal generated by the moving device and an evaluation unit to determine a first position ($\alpha 0(t1)$) specifying the position of the moving device at a first time (t1). An error distance determination unit determines a velocity of the movement of the moving device and at least one error distance ($\alpha err1$, $\alpha err2$, $\alpha err3$) specifying a distance by which the moving device moves on between the first time (t1) and a second time (t2) in dependence on the velocity and a propagation delay time (Tpd). A position correction unit is configured to determine a corrected position ($\alpha corr$) in dependence on the at least one error distance ($\alpha err1$, $\alpha err2$, $\alpha err3$) and the first position ($\alpha 0(t1)$). This disclosure uses an improved approach compared to the method implemented in Infineon's TLE5012B by including not only velocity, but also acceleration and jerk for calculating the propagation delay. However, this approach also uses consecutive measurement samples as a basis for calculating the propagation delay, therefore any error in the samples will lead to errors in the calculated velocity, acceleration or jerk and consequently, inaccuracy of the calculated propagation delay error.

In the present disclosure, the term 'jerk' refers to a rate of change of acceleration and/or deceleration with time.

SUMMARY

It is therefore an object of the present disclosure to improve the error detection of on-chip integrated position sensors to provide a high precision accuracy position sensor system.

This object is solved by a method for detecting an error of a position sensor system providing a position signal, particularly for a rotational position sensor system, comprising the steps of:
  determining the period length of at least three previous signal periods of the position signal of at least one position sensor of the position sensor system,
  comparing the period lengths of the at least three previous signal periods of the position signal to detect a constant velocity position signal, a constant accelerating or decelerating position signal or a position signal with a constant rate of acceleration or deceleration,
  predicting the period length of the next signal period of the position signal based on the previous comparison,
  transferring the predicted period length of the next signal period to a predicted position signal for the next signal period, and
  comparing the predicted position signal for the next signal period with the actual position signal of the next signal period to detect errors in the position signal of the next signal period.

It has been considered that a high precision angle reference encoder cannot be integrated in a chip and that the systems and methods in the prior art trying to solve the above object in the position domain do not provide optimal results. Therefore, according to the present disclosure, the object is solved in the time domain and afterwards transferred to the position domain.

In a first step, the period length of at least three previous signal periods of the position signal of at least one position sensor of the position sensor system is determined.

In the following step, the period lengths of the at least three previous signal periods of the position signal are compared with each other to detect a constant velocity position signal, a constant accelerating or decelerating position signal or a position signal with a constant jerk.

According to a variant, a constant velocity position signal is detected if the at least three previous signal periods have the same period length.

In the simplest form of a movement, the target moves with a constant velocity, e.g. a constant rotation around an axis for a rotating system. In such a case, each period has the same length. In this simple case, only one previous signal period is needed to predict the position as a function of time. However, at least three previous signal periods are required to identify the constant velocity position signal securely.

In a variant, a constant accelerating or decelerating position signal is detected if the at least three previous signal periods have a constantly increasing or decreasing period length.

A constantly accelerating or decelerating moving target results in a constant increase or decrease of period lengths. Therefore, three previous periods are needed to predict the positions as a function of time. However, at least three previous signal periods are required to identify the constantly accelerating or decelerating position signal securely.

Pursuant to a variant, a position signal with a constant rate of acceleration or deceleration is detected if the at least three previous signal periods have an exponentially increasing or decreasing period length.

A target with a constant jerk, i.e. a constant rate of acceleration or deceleration, results in an exponential increase or decrease of period length. Therefore, three previous signal periods are needed to predict the positions as a function of time and are sufficient to identify a position signal with a constant rate of acceleration or deceleration securely.

In mathematical terms, velocity being the first derivative and acceleration being the second derivative of position in a moving system, jerk is defined as the rate of acceleration over time, or the third derivative of position in the moving system.

Based on the comparison of the previous signal lengths and the identified type of position signal change, i.e. movement type of the target, the period length of the next signal period of the position signal can be predicted. This predicted period length of the next signal period of the position signal can be transferred from the time domain to the position domain.

Finally, the predicted position signal for the next signal period is compared with the actual position signal of the next signal period to detect errors in the position signal of the next signal period.

This method according to the present disclosure can improve the accuracy of the sensor error calculation and can detect and correct sensor errors. The method can be implemented on-chip with reasonable cost and effort because no complex mathematical calculations and large analog blocks or high-precision oscillators are required. Furthermore, no end-of-line calibration is needed and a position sensor system implementing the method according to the present disclosure can be running stand-alone, for example as a redundant position sensing method in sensors geared towards single-chip ASIL-D systems.

The method according to the present disclosure can be used for example for detecting rotational movement including high dynamic velocity changes.

The method according to the present disclosure predicts the positions based on the previous period lengths, if that movement can be described by:

$$\varphi(t) = \varphi_0 + v_0 * t + \frac{1}{2}a_0 t^2 + \frac{1}{6}jt^3$$

wherein: $\varphi$=instantaneous position
$\varphi_0$=initial position (=0° at trigger point)
$v_0$=initial velocity
$a_0$=initial acceleration or deceleration
j=jerk (rate of acceleration or deceleration)
t=instantaneous time since end of the last period.

As long as j (rate of acceleration/deceleration change) is constant, the instantaneous position $\varphi(t)$ at a given time t can be precisely predicted after gathering the duration of three previous periods. If j is fluctuating, for example due to sudden change in movement, it will not be able to precisely predict the instantaneous position. However, as soon as the movement is back to constant jerk, the prediction is accurate again. The larger the sudden change in jerk, the larger is the error of the method according to the present disclosure during that change. Therefore, a prime approach to keep the error small is to keep j small, for example due to increased mass of the moving, e.g. rotating, object to be measured as a large mass will counteract sudden changes in velocity, acceleration or jerk.

Furthermore, any change in movement direction, like a rotational movement change from clockwise to counter-clockwise rotation or vice versa, requires up to three periods in the same direction before the method according to the present disclosure provides correct error values.

According to a variant, the method further comprises the step of comparing a predicted zero position for the next signal period with the actual zero position of the position sensor for the next signal period to predict the precision of the method. If the predicted zero position for the next signal period differs from the actual zero position, the prediction of the method is still subject to an error, which can for example occur during the first three signal periods or if the movement of the target abruptly changes. This variant allows a self-check of the accuracy of the error detection of the method according to the present disclosure. It is possible to predict the precision of the inventive method at the end of each period by comparing the predicted position with the actual zero position. Ideally, at the beginning of each new period, the predicted position should be 360°=0°. Any deviation of this prediction indicates an error of the inventive method, for example due to above-mentioned sudden changes in acceleration or speed.

In a variant, the position signal has a positive half-period and a negative half-period. In other words, the position signal is periodically alternating around zero, like sine or cosine position signals.

Pursuant to a variant, the method comprises the step of detecting and comparing the peak amplitudes and/or time-lengths of the positive half-period and the negative half-period to detect an offset error in the position signal. The offset error relates to a DC component in the position signal, which shifts the position signal relative to the zero-crossing. Thereby the peak amplitudes and time-lengths of the positive and negative half-periods differ from each other. By detecting either of these two features, the method can detect the offset error relating to the DC component in the position signal.

According to a variant, the method comprises the step of correcting the position signal with an offset error by adding a DC signal to the position signal, wherein the DC signal has an opposite polarity with respect to the offset error. Once the offset error has been detected, it can be corrected by applying the DC signal to the position signal having opposite polarity with respect to the offset error.

In a variant, the method according to the present disclosure is additionally performed for half-period lengths of the position signal, quarter-period lengths of the position signal and/or eighth-period lengths of the position signal. This increases the reaction time of the method to sudden changes in the velocity of the target. The method needs at least two, or three, previous signal lengths to detect position errors. If the method is not only performed for full period length but additionally for half-period lengths of the position signal, quarter-period lengths of the position signal and/or eighth-period lengths of the position signal the reaction time of the method with respect to sudden changes in the velocity of the target is improved.

Pursuant to a variant, the full-period length of the positions signal, the half-period length of the positions signal, the quarter-period length of the positions signal and/or the eighth-period length of the positions signal are detected by a zero-crossing of the rising and/or falling edge of a sine and/or cosine position signal and/or by a crossing of a sine and cosine position signal.

According to a variant, the detected error is used for error monitoring, error correction of the position signal of the position sensor system, linearization of the position signal of the position sensor system or propagation delay compensation for the position signal of the position sensor system.

In case of error monitoring, a first signal processing unit is providing the output of the position sensor system, particularly using a method according to the prior art, which e.g. does not have any error detection. A second signal processing unit implements the inventive methods and monitors the error of the first signal processing unit and issues a warning if the error exceeds a certain limit. In case of error correction, the first signal processing unit and the second signal processing unit provide a position output. During periods where the inventive methods does not provide exact results, e.g. during the first two to three signal periods, the first signal processing unit provides the output for the position sensor system. Once the inventive method is in the locked state and provides reliable results, the second signal processing unit provides the output of the positions sensor system. If the first signal processing unit is using a linearization scheme known from the prior art to determine the position output of the position sensor system, the results of the inventive method calculated by the second signal processing unit can be used to provide a reference position for the linearization scheme used by the first signal processing unit. The results of the inventive method can be used for linearization as long as it is error free, which can be checked by self-monitoring the determined error as already disclosed above. The inventive method can be further used to determine the propagation delay and the error related thereto. In this variant, a counter is triggered directly by the input signal, immediately following the sensor input signal, having no or almost no delay. At the same time, the signal processing in the first signal processing unit causes some delay, which would lead to errors if not compensated. As soon as the first signal processing unit has calculated a zero position, respectively as soon as the output of the first signal processing unit crosses the 0°↔360° transition, the value of the counter is saved. The saved counter value is representative of the propagation delay, counting the time $t_P$ from the zero position at the input (e.g. rising edge of sine signal) to the calculated zero position at the output of the first signal processing unit. By calculating the position at time=$t_P$, the actual error caused by the propagation delay $\varphi_P$ can be obtained, including motion with a constant velocity, a constant acceleration/deceleration and a constant jerk. Further, as the parameters for calculating the position as a function of elapsed time are obtained from previous period lengths, they are more precise than the methods of the prior art.

The object is further solved by a position sensor system providing a periodic position signal along a movement path, comprising at least one position sensor providing the periodic position signal and at least one signal processing unit for processing the position signal of the at least one position sensor, wherein the signal processing unit implements the method according to the present disclosure. The position sensor system can further comprise a first signal processing unit providing a position signal according to the prior art and a second signal processing unit implementing the method according to the present disclosure, wherein both signal processing units receive the periodic position signal of the same position sensor.

The position sensor can be any type of position sensor, such as inductive, magnetic, optical, capacitive, resistive or any other applicable technology. In an example, the position sensor provides a sine position signal and a phase-shifted cosine position signal. For the error detection according to the present disclosure it is sufficient if the position sensor provides a digital output, for example by a Hall switch, magnetic reed switch or similar circuit. However, the output of the position sensor system providing the actual position bases on an analog position sensor signal.

Pursuant to a variant, the position sensor system comprises a first position sensor providing a first position signal to a first signal processing unit according to the prior art, and a second position sensor providing a second position signal to a second signal processing unit implementing the method according to the present disclosure, wherein an error is estimated based on a comparison of the processed first position signal with the processed second position signal. In this variant the position sensor system comprises a first position sensor subsystem comprising the first position sensor and the first signal processing unit and a second position sensor subsystem comprising the second position sensor and the second signal processing unit.

The first signal processing unit does not implement an error detection and processes the first position sensor signal according to the prior art. The second signal processing unit processes the second position sensor signal according to the inventive method. A comparison of the results of the first signal processing unit and the second signal processing unit can detect the error in the results of the first position sensor subsystem.

The first position sensor provides an analog position sensor to the first signal processing unit. The second position sensor can provide a digital or analog position signal to the second signal processing unit, wherein an analog position signal can be converted into a digital position signal prior to the second signal processing unit. This conversion can be done by respective analog-to-digital converters like comparators.

Particularly, the first position sensor subsystem provides the analog output of the position sensor system, while the second position sensor subsystem provides the detected error in the position signal of the first position sensor subsystem. This error can be provided to the system using the position sensor system or can be used to correct the signal of the first position sensor subsystem.

In a variant, the comparison is performed by a comparator, which is part of or connected to the first signal processing unit, the second signal processing unit or an external component. Thus, the error of the position sensor can be calculated in the first position sensor subsystem, in the second position sensor subsystem or external to the position sensor.

According to a variant, the position sensor system is implemented in a single integrated circuit.

Pursuant to a variant, the at least one signal processing unit is connected to or part of a motor control of the system using the position sensor system. Thus, the position sensor system according to the present disclosure can send a warning to the motor control if an error is exceeding a predefined level and/or send correction parameters to the motor control to correct a detected error.

In a variant, the position sensor system further comprises a switch, for connecting the output of the first signal processing or the output of the second signal processing unit to the output of the position sensor system. For example, the method according to the present disclosure needs at least two, more likely three, signal periods to detect and correct different types of errors. During these two or three signal periods, the error associated with the method according to the present disclosure can be higher than for methods known from the prior art. Thus, during such periods the switch can connect the first signal processing unit to the output of the position sensor system and after the method according to the present disclosure provides a higher accuracy the output of the second signal processing unit is connected to the output of the position sensor system by the switch.

BRIEF DESCRIPTION OF THE DRAWINGS

In the following, the invention will be further explained with respect to the embodiments shown in the figures. It shows.

DETAILED DESCRIPTION

Figure 1:
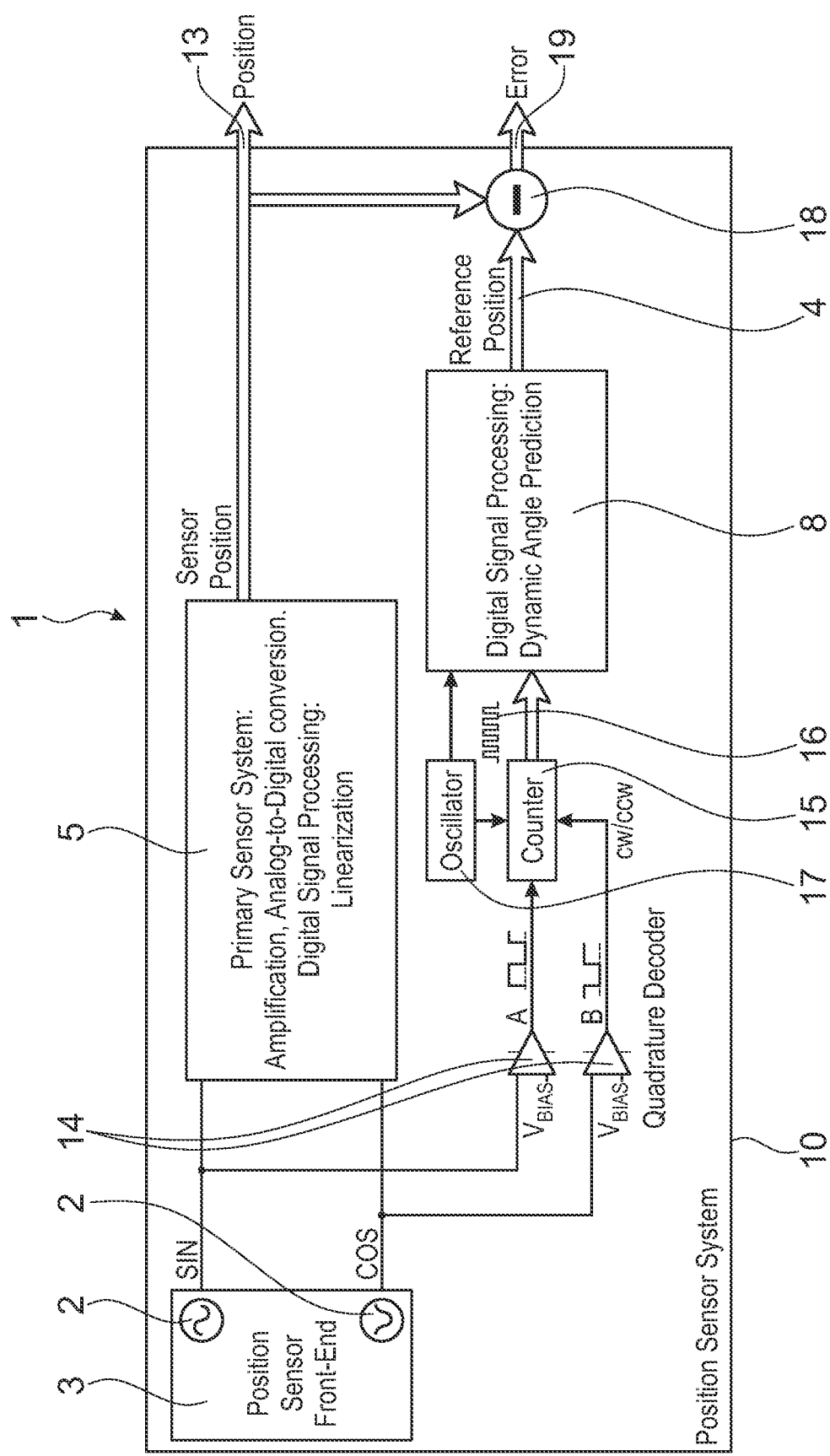
FIG. 1 a block diagram of a first embodiment of a position sensor system.

FIG. 1 shows a block diagram of a first embodiment of a position sensor system 1 according to the present disclosure. The position sensor system 1 provides a periodic position signal 2 along a movement path of a target relating to the system using the position sensor system 1, like e.g. a motor control. In a variant, the position sensor system 1 detects a rotational movement of the target around an axis. For example, the target is attached to a rotating shaft of a motor.

The position sensor system 1 shown in FIG. 1 comprises a position sensor 3, providing the periodic position signal 2. According to the embodiment of FIG. 1, the position sensor 3 provides a sine position signal 2 and a phase-shifted cosine position signal 2, as known from the prior art.

The position sensor system 1 comprises a first signal processing unit 5, which processes the periodic position signal 2 of the position sensor 3. Usually, the periodic position signal 2 of the position sensor 3 is amplified, converted from the analog domain to the digital domain and afterwards processed to determine the position of the target from the periodic position signals 2 of the position sensor 3. A linearization algorithm might be used for improving the results of the position determination. Afterwards, the processed periodic position signal 2 of the position sensor 3 is forwarded to a position output 13 of the position sensor system 1. The processed periodic position signal 2 indicates the position of the target, but is subject to errors as discussed above with respect to the prior art.

To estimate the error of the signal at the position output 13, the position sensor system 1 further comprises a second signal processing unit 8. The periodic position signals 2 of the position sensor 3 are converted from the analog domain to the digital domain, e.g. by using comparators 14. The converted periodic position signals 2 are processed by the second signal processing unit 8, which implements the method according to the present disclosure.

In a first step, the period length of at least three previous signal periods of the periodic position signal 2 of the position sensor 3 is determined. This determination uses for example a counter 15 and a clock signal 16 provided by an oscillator 17. The counter 15 counts the pulses of the clock signal 16 during one signal period of the periodic position signal 2. This step is performed continuously for every new signal period of the periodic position signal 2. The counter 15, the clock signal 16 and the oscillator 17 can be integral parts of the second signal processing unit 8 or external thereto.

In a second step, the period lengths of the at least three previous signal periods of the periodic position signal 2 are compared to each other, to detect a constant velocity position signal 2, a constant accelerating or decelerating position signal 2 or position signal 2 with a constant rate of acceleration or deceleration.

The constant velocity position signal 2 is detected if the at least three previous signal periods have the same period length. The constant accelerating or decelerating position signal 2 is detected if the at least three previous signal periods have a constantly increasing or decreasing period length. And the position signal 2 with a constant rate of acceleration or deceleration is detected if the at least three previous signal periods have an exponentially increasing or decreasing period length.

In the next step, the period length of the next signal period of the periodic position signal 2 is predicted based on the previous comparison. If the movement of the target is identified, i.e. a target with a constant velocity, a constant acceleration/deceleration or a constant rate of acceleration deceleration, the second signal processing unit 8 can easily predict the period length of the next periodic position signal 2. The predicted length of the next periodic position signal 2 is transferred to a predicted position signal 4 for the next signal period. Thus, the result of the processing of the previous periods of the periodic position signal 2, i.e. the predicted length of the next signal period, is transferred from the time domain to the position domain.

Finally, the predicted position signal 4 for the next signal period is compared with the actual position signal 2 of the next signal period to detect errors in the position signal 2 of the next signal period. According to the first embodiment shown in FIG. 1, the results of the first signal processing unit 5 are compared with the results of the second signal processing unit 8 by a comparator 18 providing a mathematical comparison. The result of the mathematical comparison, i.e. the determined error, is forwarded to an error output 19 of the position sensor system 1.

The components of the position sensor system 1 are all contained in a single integrated circuit (IC) according to the embodiment of FIG. 1.

The position signal 2 can have a positive half-period and a negative half-period, like e.g. the sine signal and the phase-shifted cosine signal of the position sensor 3. In this case, the method can further comprise the step of detecting and comparing the peak amplitudes and/or time-lengths of the positive half-period and the negative half-period to detect an offset error in the position signal 2. The detected offset error of the position signal 2 can be corrected by adding a DC signal to the position signal 2, wherein the DC signal has an opposite polarity with respect to the offset error.

Furthermore, the position sensor system 1 can compare the predicted zero position for the next signal period with the actual zero position of the position sensor (3, 6) for the next signal period to predict the precision of the method implemented by the second signal processing unit 8. Thus, the position sensor system 1 can self-check the precision of the error determination.

According to the first embodiment shown in FIG. 1, the error of the position sensor system 1 is monitored and forwarded to the error output 19 for further processing by the system using the position sensor system 1.

Figure 2:
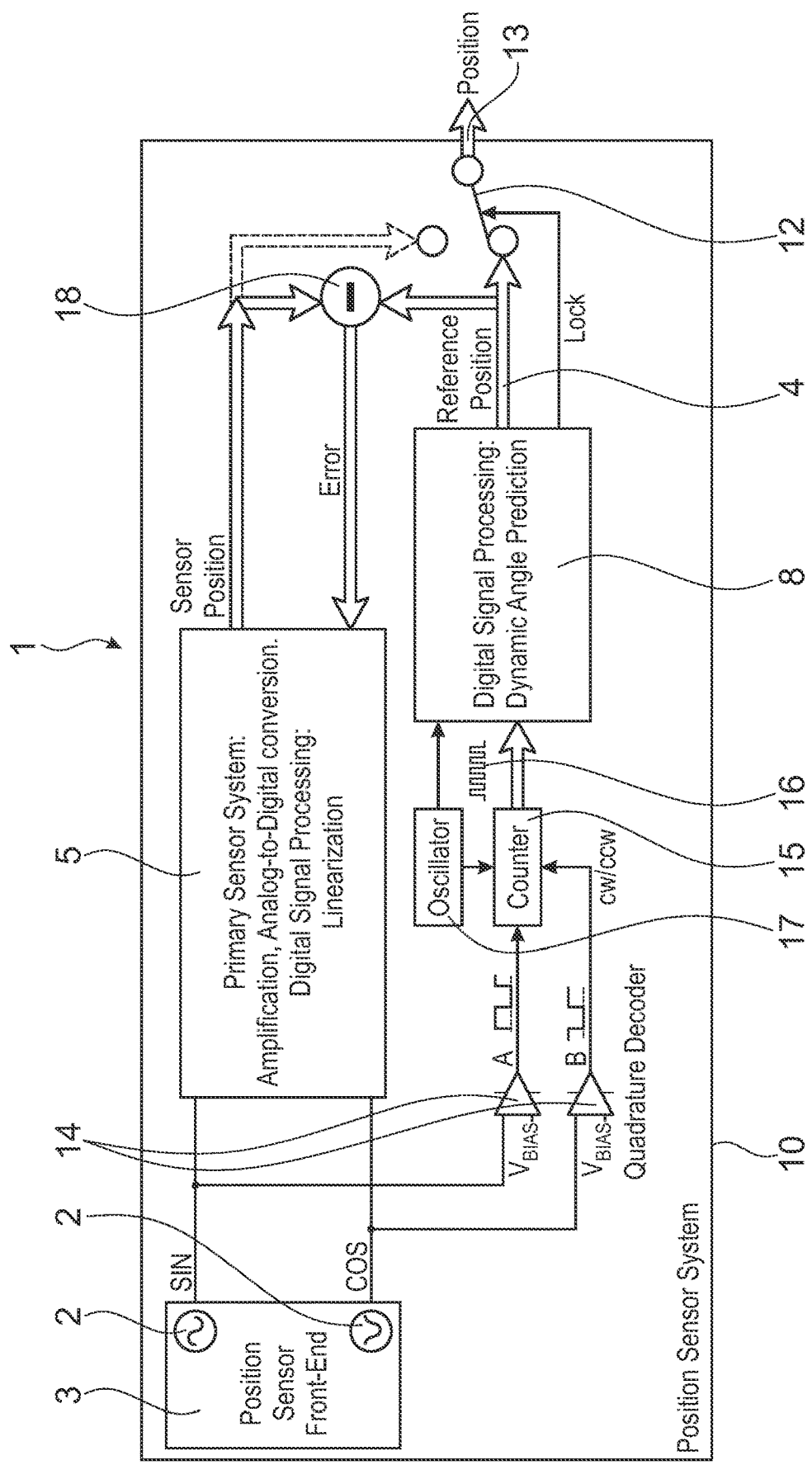
FIG. 2 a block diagram of a second embodiment of a position sensor system.

FIG. 2 shows a block diagram of a second embodiment of a position sensor system 1 according to the present disclosure. The second embodiment shown in FIG. 2 differs from the first embodiment shown in FIG. 1 by a digital switch unit 12. The digital switch unit 12 can connect a position output 13 of the position sensor system 1 with the output of a first signal processing unit 5 or a second signal processing unit 8.

As long as the second signal processing unit 8 does not provide an error free predicted position signal 4, the position output 13 is connected to the first signal processing unit 5. Once the method provides the error free predicted position signal 4, the position output 13 of the position sensor system 1 is connected to the second signal processing unit 8, which provides an error free position signal.

As explained in the first embodiment, the output of the first signal processing unit 5 and the second signal processing unit 8 can be compared to each other to determine the error associated with the output of the first signal processing unit 5. The error information is for example provided to the first signal processing unit 5.

According to the second embodiment shown in FIG. 2, the error of the position sensor system 1 is corrected.

Figure 3:
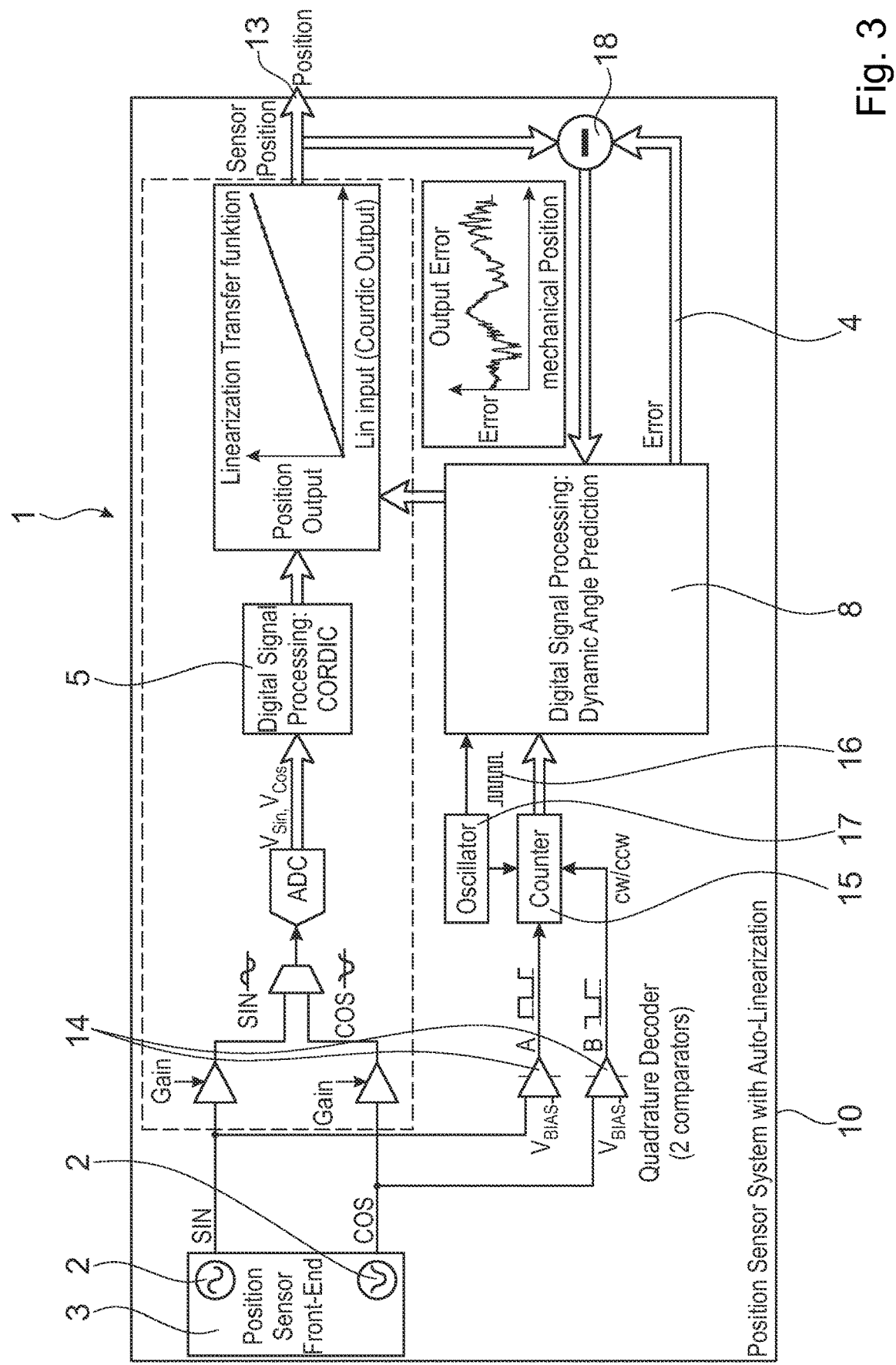
FIG. 3 a block diagram of a third embodiment of a position sensor system.

FIG. 3 shows a block diagram of a third embodiment of a position sensor system 1 according to the present disclosure. According to the third embodiment, the first signal processing unit 5 implements a linearization method, which is generally known from the prior art. The linearized result of the first signal processing unit 5 is forwarded to the position output 13 of the position sensor system 1.

A comparator 18 providing the mathematical comparison compares the result of the first signal processing unit 5 with the result of the second signal processing unit 8, which implements the method according to the present disclosure. The result of this comparison equals to the error in the result of the first signal processing unit 5, as explained in detail above. This error is forwarded via the second signal processing unit 8 or directly to the first signal processing unit 5, particularly to the linearization scheme implemented in the first signal processing unit 5. The detected error is used to improve the linearization of the position signal 2 by the first signal processing unit 5.

In all other aspects, the third embodiment of FIG. 3 corresponds to the first and second embodiment of FIGS. 1 and 2.

Figure 4:
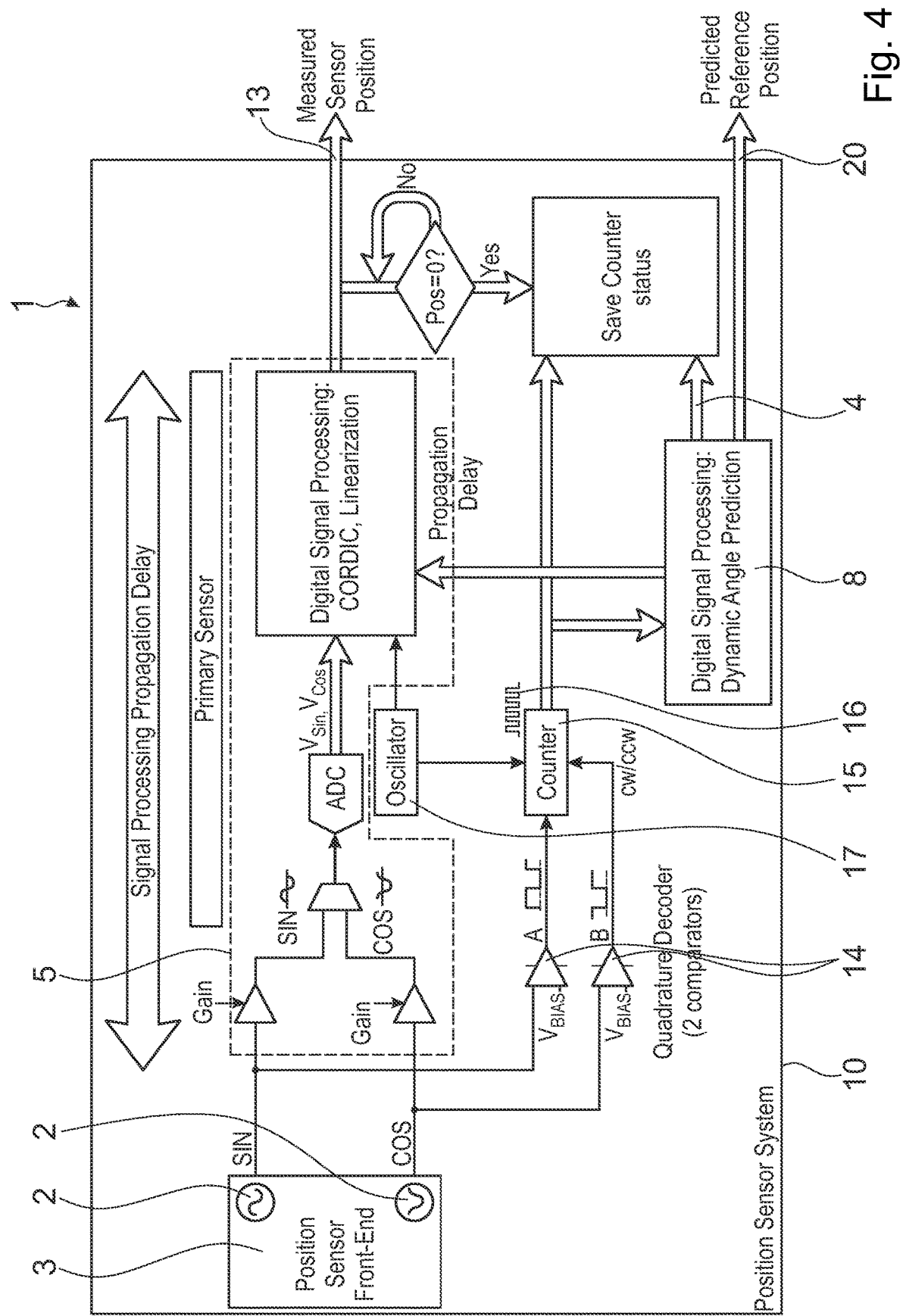
FIG. 4 a block diagram of a fourth embodiment of a position sensor system.

FIG. 4 shows a block diagram of a fourth embodiment of a position sensor system 1 according to the present disclosure. The fourth embodiment implements a precision propagation delay compensation. A counter 15 is triggered directly by the position signal 2 of the position sensor 3, having no or almost no delay. At the same time, the processing of the position signal 2 by a first processing unit 5 causes some delay, which would lead to errors if not compensated. As soon as the first signal processing unit 5 has calculated the end of a signal period, e.g. a zero-crossing of the rising edge of a sine position signal 2, respectively as soon as output of the first signal processing unit 5 crosses the 0°←→360° transition, the value of the counter 15 is saved. The saved counter value is representative of the propagation delay, counting the time $t_P$ from the zero position at the input position signal 2 to the calculated zero position at the output of the first signal processing unit 5. By calculating the position at time=$t_P$, by the method according to the present disclosure, the actual error caused by the propagation delay $\phi_P$ can be obtained, including motion with a constant velocity, a constant acceleration/deceleration and a constant jerk.

Figure 5:
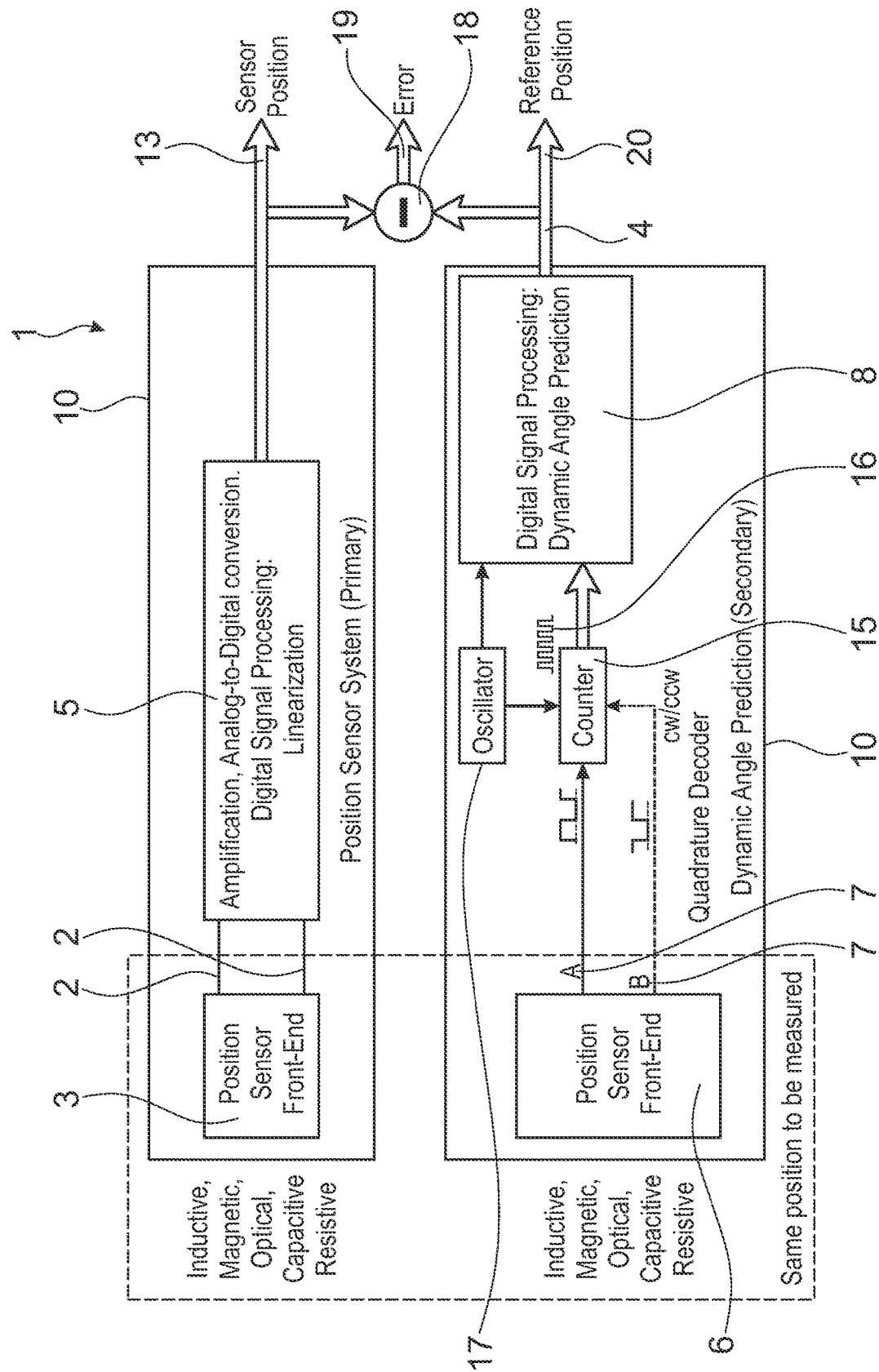
FIG. 5 a block diagram of a fifth embodiment of a position sensor system.

Further, as the parameters for calculating the position are obtained as a function of elapsed time from previous period lengths, they are more precise than the methods known from the prior art, which rely on potentially inaccurate positions, leading to potentially inaccurate calculation of propagation delay errors. FIG. 5 shows a block diagram of a fifth embodiment of a position sensor system 1 according to the present disclosure. According to the fifth embodiment, the position sensor system 1 comprises a first position sensor 3 and a second position sensor 6.

The first position sensor 3 provides a periodic position signal 2, particularly an analog position signal 2 like a sine and cosine signal, to a first signal processing unit 5. The first signal processing unit 5 calculates the position based on the position signal 2, which usually comprises amplifying the position signal 2, converting the amplified signal from the analog domain to the digital domain and digitally processing the signal. The output of the first signal processing unit 5 corresponds to the position of the target and is forwarded to the position output 13. However, this calculated position output signal 13 is subject to certain errors, as explained above with respect to the prior art.

The second position sensor 6 provides a periodic position signal 7, particularly a digital position signal, to a second signal processing unit. As already discussed with respect to the first embodiment of FIG. 1, the period lengths of at least three previous signal periods of the position signal 7 are determined by a counter 15 and a clock signal 16 of an oscillator 17. A second signal processing unit 8 predicts the period length of the next position signal and transfers this period length to a predicted position signal 4, which is forwarded to reference position output 20 and to comparator 18 providing the mathematical comparison, for comparing the predicted position signal 4 with the position signal 13 of the first signal processing nit 5. The corresponding error determined by the comparator 18 is forwarded to the error output 19.

The first position sensor 3 and the first signal processing unit 5 are contained in a single integrated circuit 10, while the second position sensor 6, the counter 15, oscillator 17 and the second signal processing unit 8 are contained in another single integrated circuit 10.

The first position sensor 3 and the second position sensor 6 detect the movement of the same target.

Figure 6:
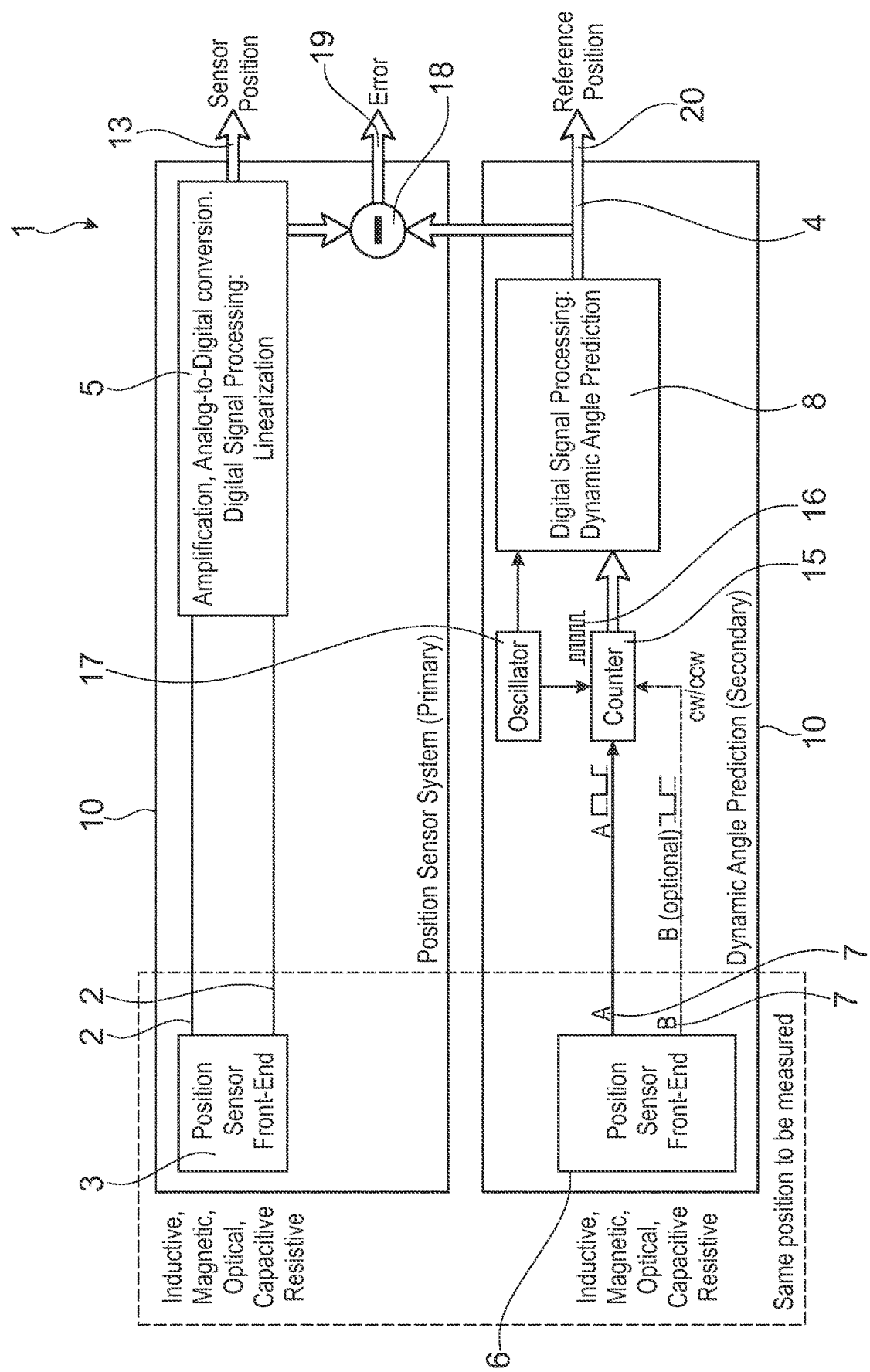
FIG. 6 a block diagram of a sixth embodiment of a position sensor system.
Figure 7:
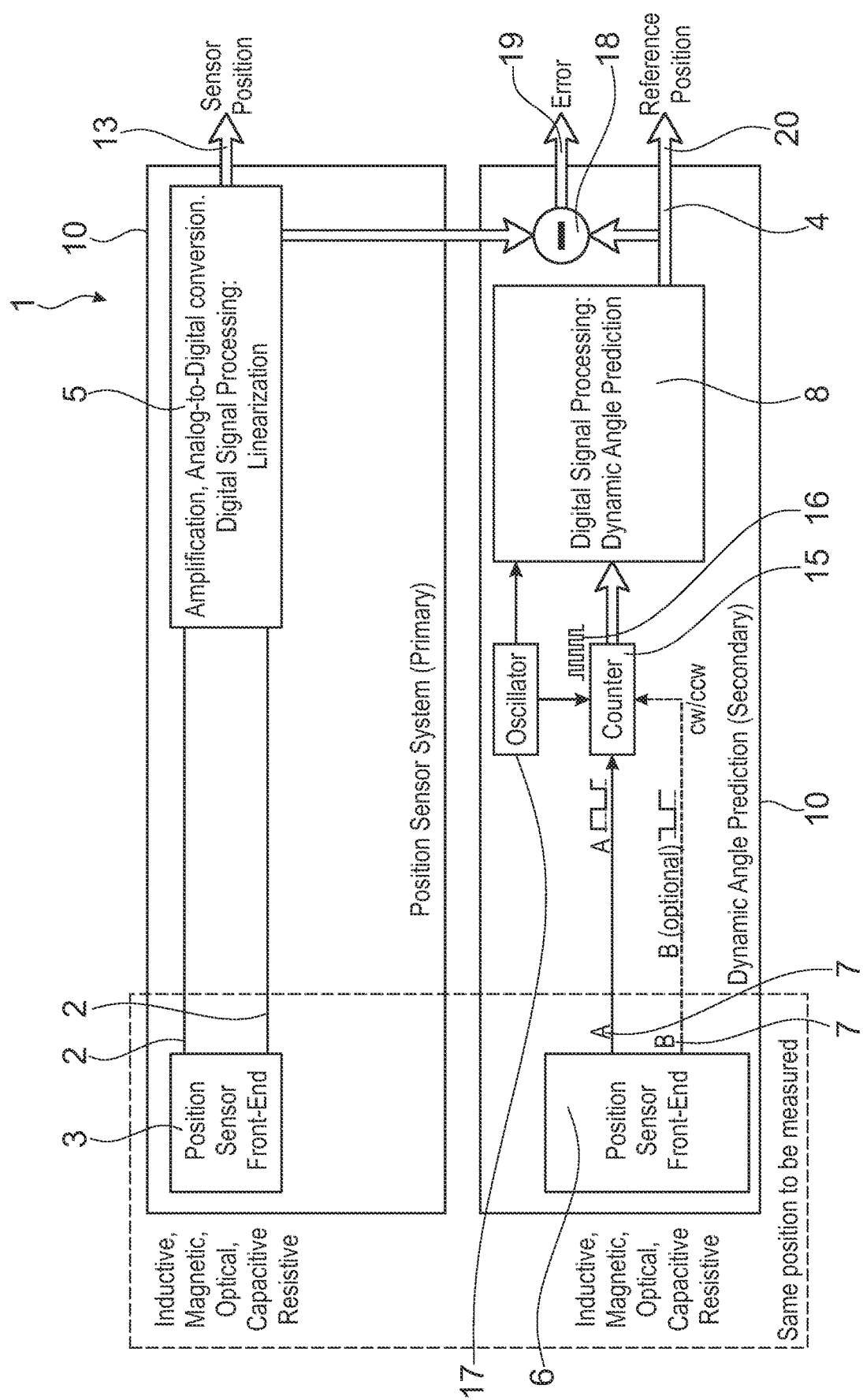
FIG. 7 a block diagram of a seventh embodiment of a position sensor system.

FIG. 6 shows a block diagram of a sixth embodiment of a position sensor system 1 according to the present disclosure and FIG. 7 shows a block diagram of a seventh embodiment of a position sensor system 1 according to the present disclosure. The fifth embodiment of FIG. 5, sixth embodiment of FIG. 6 and seventh embodiment of FIG. 7 differ from each other with respect to the position of the comparator 18 providing the mathematical comparison, which can be external (FIG. 5), integrated in the same integrated circuit 10 as the first signal processing unit (FIG. 6) or integrated in the same integrated circuit 10 as the second signal processing unit (FIG. 7).

Figure 8:
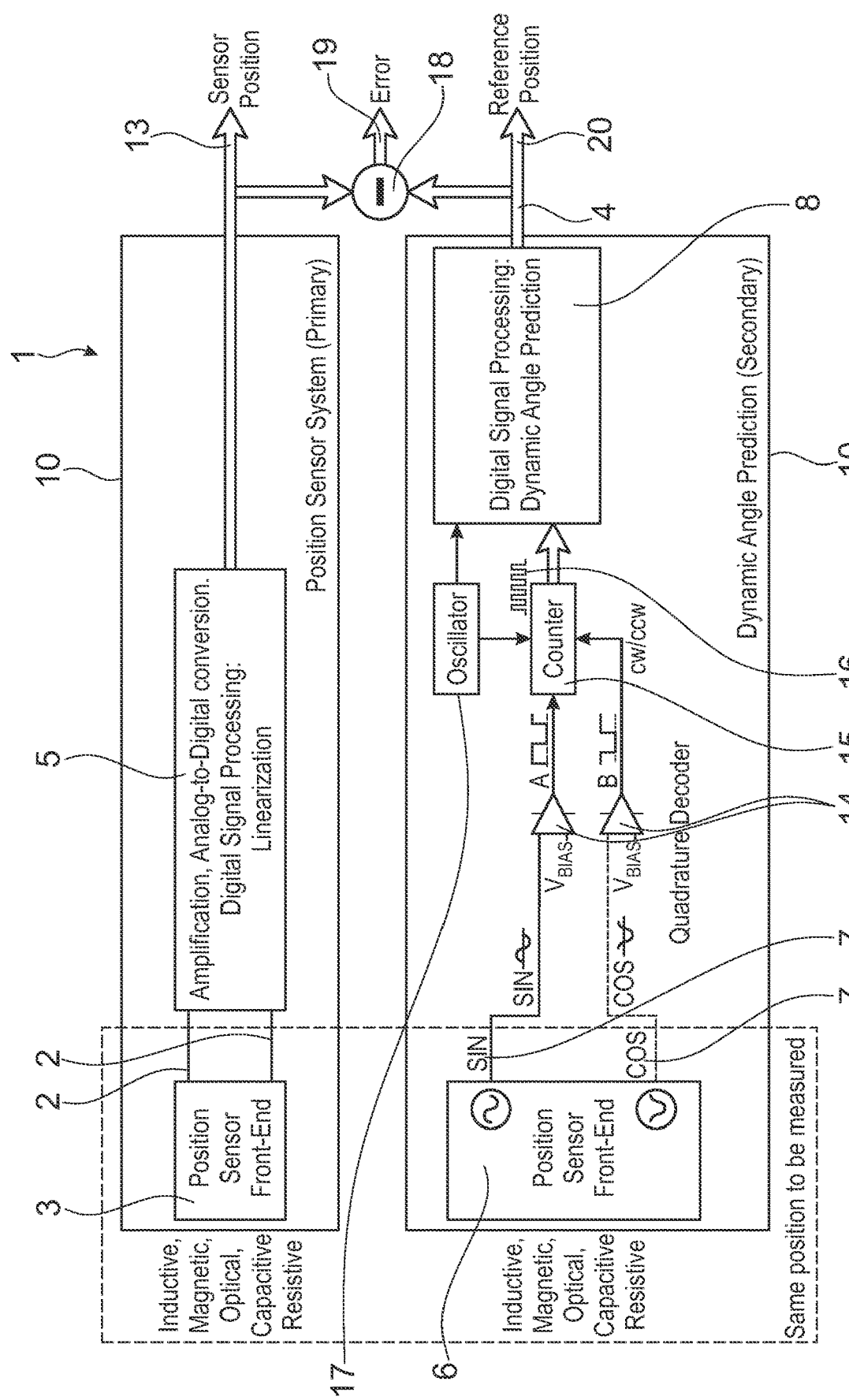
FIG. 8 a block diagram of an eighth embodiment of a position sensor system.

FIG. 8 shows a block diagram of an eighth embodiment of a position sensor system 1 according to the present disclosure. The eighth embodiment of FIG. 8 differs from the fifth embodiment of FIG. 5 in that a second position sensor 6 provides an analog second position signal 7 instead of a digital one. Therefore, an integrated circuit 10 comprising a second signal processing unit 8 further comprises at least one comparator 14 to convert the analog second position signal 7 to a digital position signal for further processing.

Figure 9:
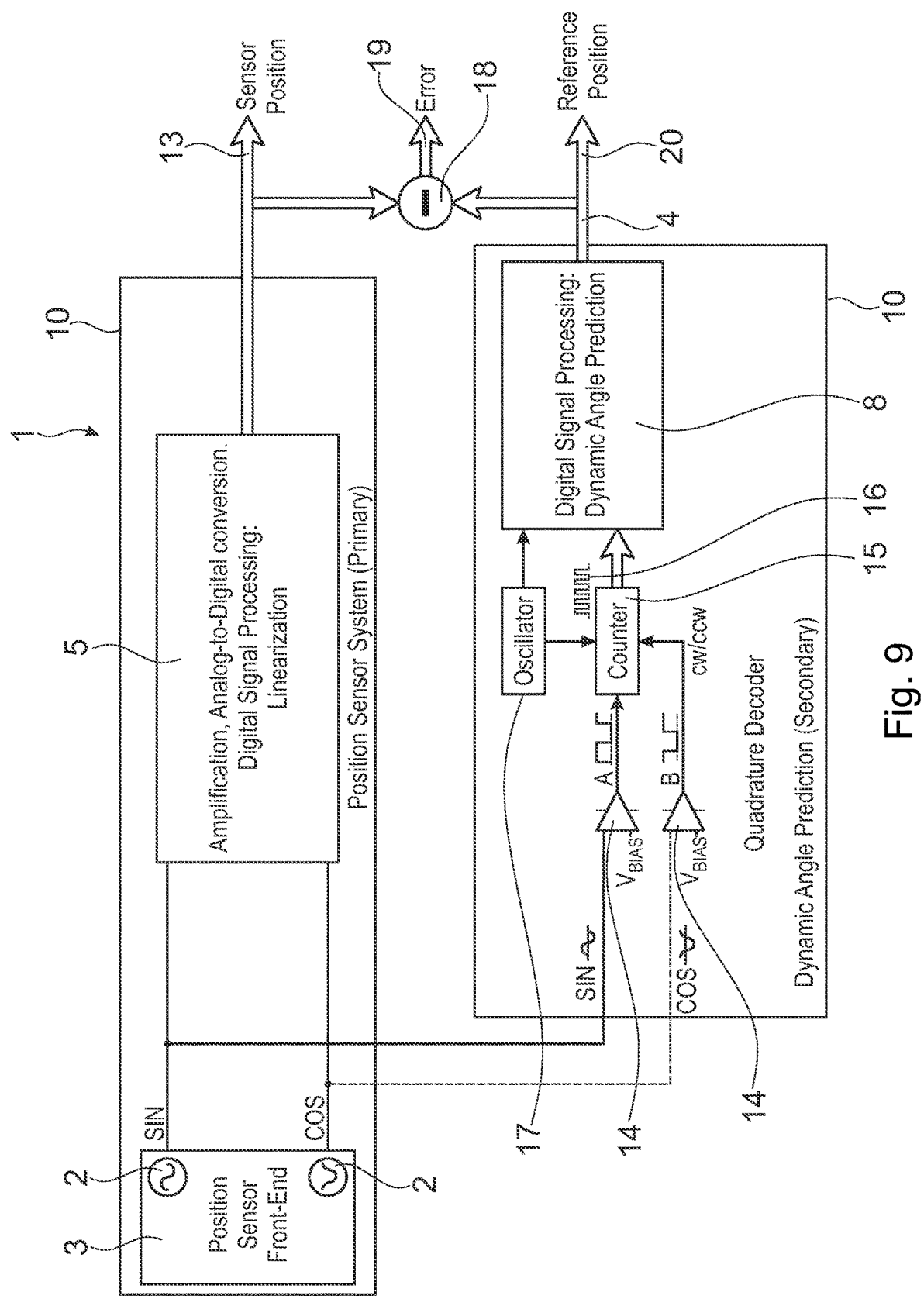
FIG. 9 a block diagram of a ninth embodiment of a position sensor system.

FIG. 9 shows a block diagram of a ninth embodiment of a position sensor system 1 according to the present disclosure. The ninth embodiment of FIG. 9 differs from the eighth embodiment of FIG. 8 in that the second position sensor 6 is missing. An analog-to-digital comparator 14, a counter 15 and a second signal processing unit 8 process a position signal 2 of a first position sensor 3.

Figure 10:
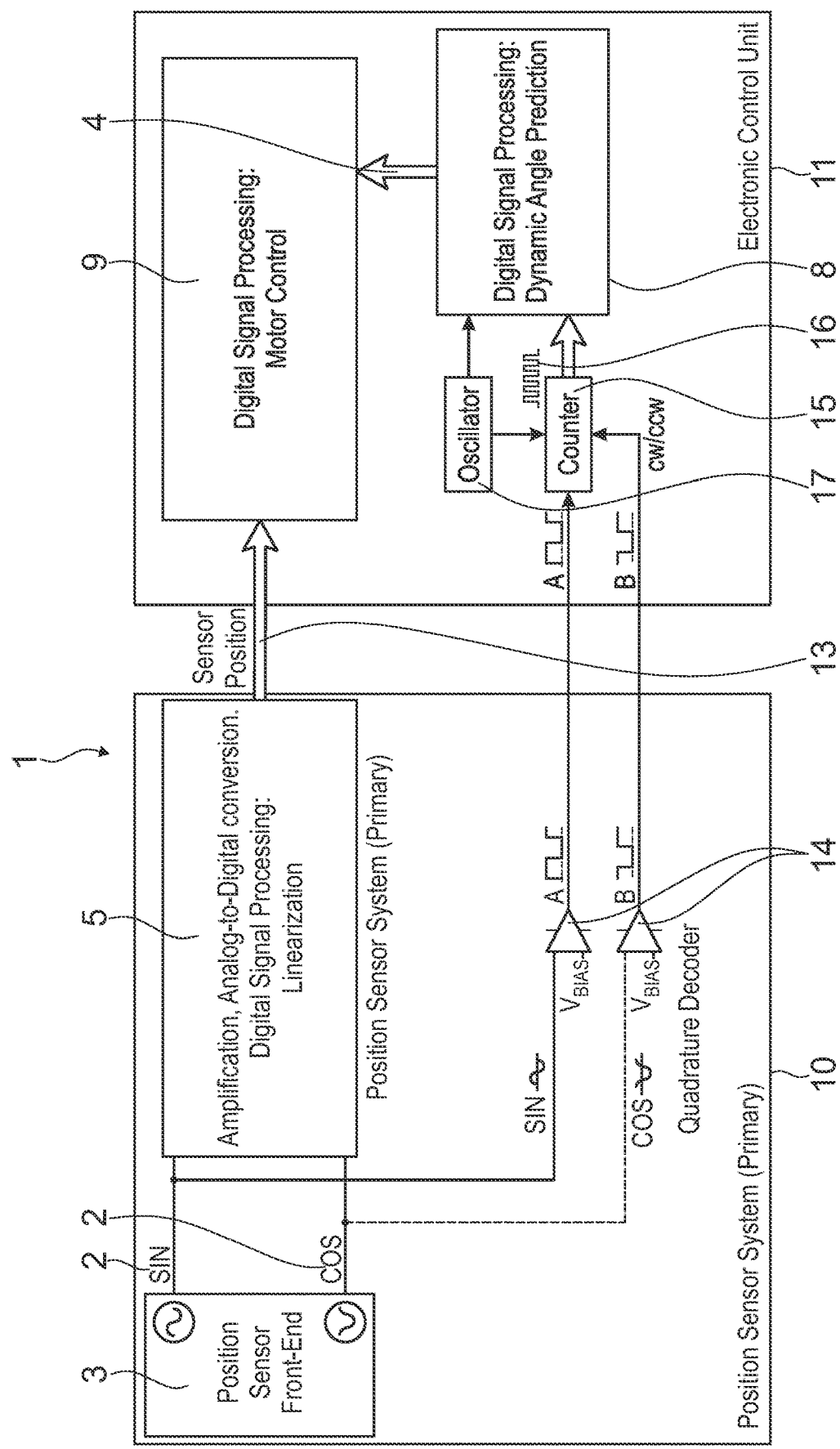
FIG. 10 a block diagram of a tenth embodiment of a position sensor system.

FIG. 10 shows a block diagram of a tenth embodiment of a position sensor system 1 according to the present disclosure. According to this tenth embodiment, a counter 15, an oscillator 17 and a second signal processing unit 8 are integrated in an electronic control unit 11, driving the target which position is to be detected. The comparison of the predicted position signal 4 and the position signal of a first signal processing unit 5 at a signal output 13 is performed by a third signal processing unit 9, which is part of the electronic control unit 11.

Figure 11:
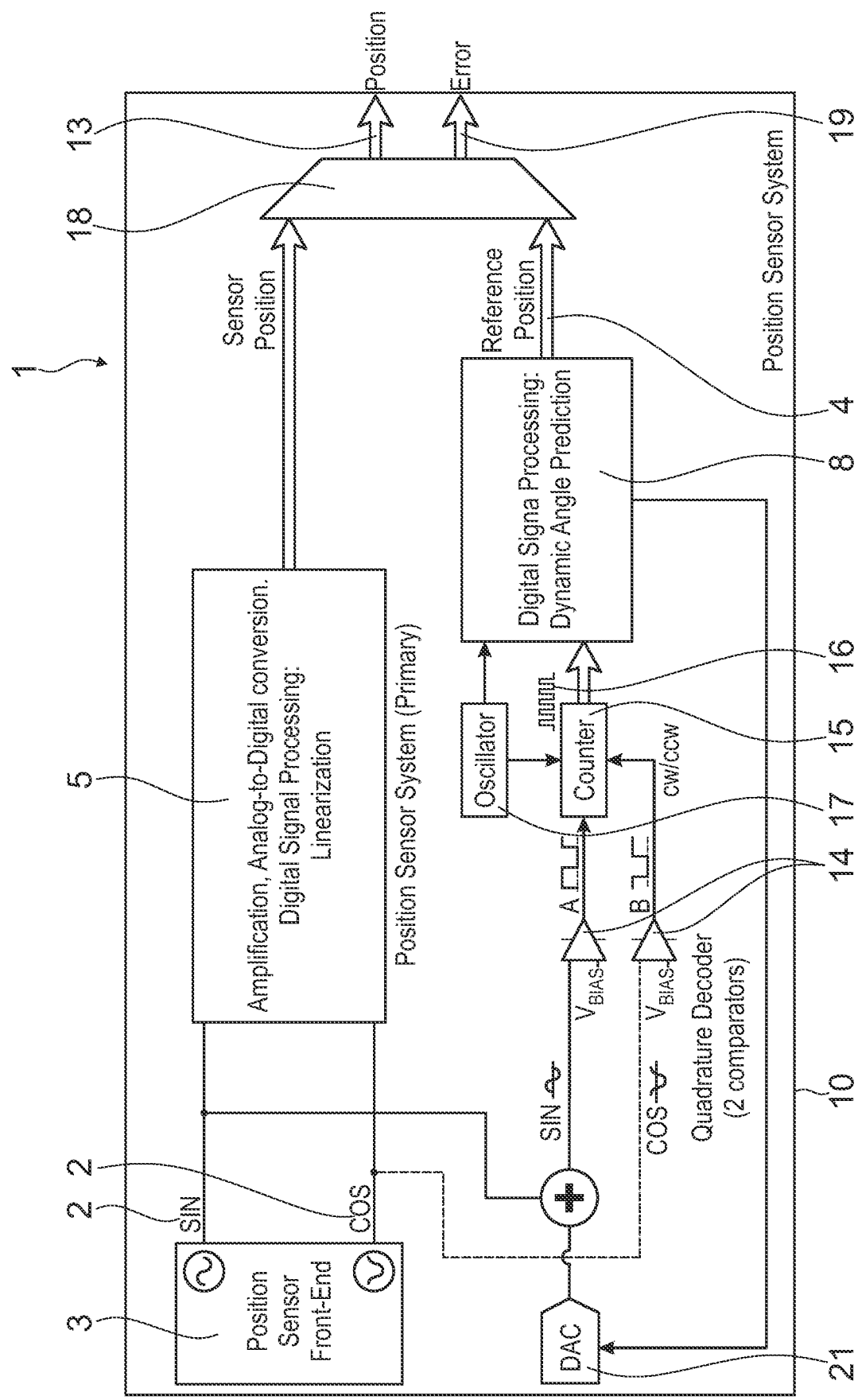
FIG. 11 a block diagram of an eleventh embodiment of a position sensor system, and FIG. 12 a block diagram of a twelfth embodiment of a position sensor system.

FIG. 11 shows a block diagram of an eleventh embodiment of a position sensor system 1 according to the present disclosure. The eleventh embodiment of FIG. 11 differs from the first embodiment of FIG. 1 by further comprising a digital-to-analog converter 21, which can add a DC component to the position signal 2 of a position sensor 3. In this eleventh embodiment, a second signal processing unit 8 detects any DC offset in the position signal 2 of a position sensor 3. This can be done by comparing the positive and negative peak amplitudes of the position signal 2 or by comparing the period length of the positive and negative half-periods of the position signal 2. If the second signal processing unit 8 detects a DC offset in the position signal 2, it can be corrected by the digital-to-analog converter 21, receiving a corresponding control signal of the second signal processing unit 8 and adding a DC signal to the position signal 2 with opposite value of the DC offset.

Figure 12:
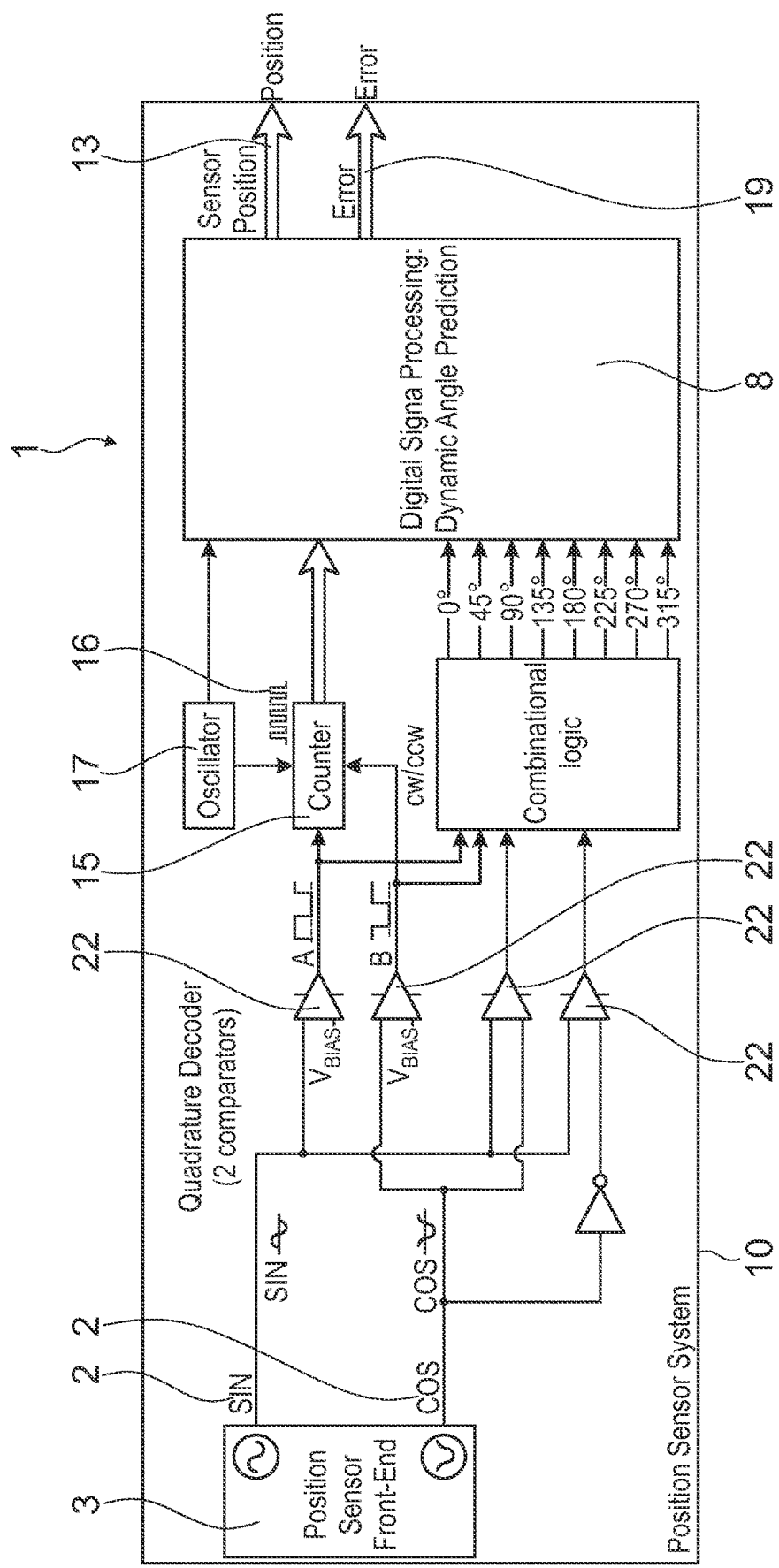

FIG. 12 shows a block diagram of a twelfth embodiment of a position sensor system 1 according to the present disclosure. According to this embodiment, the method according to the present disclosure is additionally performed for half-period length of the position signal 2, quarter-period length of the position signal 2 and eighth-period length of the position signal 2. The full-period length of the position signal 2, the half-period length of the position signal 2, the quarter-period length of the position signal 2 and the eighth-period length of the position signal 2 are detected by a zero-crossing of the rising and/or falling edge of a sine and/or cosine position signal 2 and by a crossing of the sine and cosine position signal 2. The position sensor system 1 uses position signal comparators 22 for afore-mentioned comparison of the sine and cosine position signal 2. In this embodiment, the position sensor system 1 is less susceptible to sudden changes in the velocity of the target watched by the position sensor system 1.

What is claimed is:

1. A method for detecting an error of a position sensor system providing a position signal, comprising the steps of:
    determining period lengths of at least three previous signal periods of the position signal of at least one position sensor of the position sensor system;
    comparing the period lengths of the at least three previous signal periods of the position signal to detect a constant velocity position signal, a constant accelerating or decelerating position signal or position signal with a constant rate of acceleration or deceleration;
    predicting the period length of the next signal period of the position signal based on the previous comparison,
    transferring the predicted period length of the next signal period to a predicted position signal for the next signal period; and
    comparing the predicted position signal for the next signal period with the actual position signal of the next signal period to detect errors in the position signal of the next signal period.

2. The method according to claim 1,
    wherein the constant velocity position signal is detected if the at least three previous signal periods have the same period length, wherein the constant accelerating or decelerating position signal is detected if the at least three previous signal periods have a constantly increasing or decreasing period length, and wherein the position signal with a constant rate of acceleration or deceleration is detected if the at least three previous signal periods have an exponentially increasing or decreasing period length.

3. The method according to claim 1, comprising the step of comparing a predicted zero position for the next signal period with the actual zero position of the position sensor for the next signal period to predict precision of the method.

4. The method according to claim 1,
    wherein the position signal has a positive half-period and a negative half-period.

5. The method according to claim 4, comprising the step of detecting and comparing peak amplitudes and/or time-lengths of the positive half-period and the negative half-period to detect an offset error in the position signal.

6. The method according to claim 5, comprising the step of correcting the position signal with an offset error by adding a DC signal to the position signal, wherein the DC signal has an opposite polarity with respect to the offset error.

7. The method according to claim 1,
    wherein the method is additionally performed for half-period lengths of the position signal, quarter-period lengths of the position signal and/or eighth-period lengths of the position signal.

8. The method according to claim 7,
    wherein the full-period length of the position signal, the half-period length of the position signal, the quarter-period length of the position signal and/or the eighth-period length of the position signal is detected by a zero-crossing of the rising and/or falling edge of a sine and/or cosine position signal and/or by a crossing of a sine and cosine position signal.

9. The method according to claim 1,
    wherein the detected error is used for error monitoring, error correction of the position signal of the position sensor system, linearization of the position signal of the position sensor system or propagation delay compensation for the position signal of the position sensor system.

10. A position sensor system providing a position signal along a movement path, comprising:
    at least one position sensor providing the position signal; and
    at least one signal processing unit for processing the position signal of the at least one position sensor,
    wherein the signal processing unit implements a method comprising:
        determining period lengths of at least three previous signal periods of the position signal of at least one position sensor of the position sensor system;
        comparing the period lengths of the at least three previous signal periods of the position signal to detect a constant velocity position signal, a constant accelerating or decelerating position signal or position signal with a constant rate of acceleration or deceleration;
        predicting the period length of the next signal period of the position signal based on the previous comparison,
        transferring the predicted period length of the next signal period to a predicted position signal for the next signal period; and comparing the predicted position signal for the next signal period with the actual position signal of the next signal period to detect errors in the position signal of the next signal period.

11. The position sensor system according to claim 10, comprising:
a first position sensor of the at least one position sensor, providing a first position signal;
a first signal processing unit of the at least one signal processing unit for processing the first position signal;
a second position sensor providing a second position signal; and
a second signal processing unit of the at least one signal processing unit for processing the second position signal, the second signal processing unit implementing the method,
wherein an error is estimated based on a comparison of the processed first position signal with the processed second position signal.

12. The position sensor system according to claim 11, wherein the comparison is performed by a comparator, which is part of or connected to the first signal processing unit, the second signal processing unit or an external component.

13. The position sensor system according to claim 10, wherein the position sensor system is implemented in a single integrated circuit.

14. The position sensor system according to claim 10, wherein the at least one signal processing unit is connected to or part of an electronic control unit of a system using the position sensor system.

15. The position sensor system according to claim 11, further comprising a digital switching unit, for connecting the output of the first signal processing unit or of the second signal processing unit to the output of the position sensor system.

* * * * *